United States Patent
Talbot et al.

(10) Patent No.: US 7,986,727 B2
(45) Date of Patent: Jul. 26, 2011

(54) IN-BAND METHOD TO CONFIGURE EQUALIZATION LEVELS

(75) Inventors: Gerald R. Talbot, Concord, MA (US); Larry D. Hewitt, Austin, TX (US); Paul C. Miranda, Austin, TX (US); Rohit Kumar, San Jose, CA (US); Emerson S. Fang, Fremont, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1228 days.

(21) Appl. No.: 11/614,529

(22) Filed: Dec. 21, 2006

(65) Prior Publication Data

US 2007/0230553 A1 Oct. 4, 2007

Related U.S. Application Data

(60) Provisional application No. 60/786,546, filed on Mar. 28, 2006.

(51) Int. Cl.
*H04B 1/38* (2006.01)
(52) U.S. Cl. ..................................... 375/220
(58) Field of Classification Search .......... 375/219–220, 375/229, 257, 295, 296, 377
See application file for complete search history.

(56) References Cited

U.S. PATENT DOCUMENTS

| | | | |
|---|---|---|---|
| 5,742,798 A * | 4/1998 | Goldrian ...................... 713/400 |
| 6,300,802 B1 | 10/2001 | Smetana | |
| 6,433,579 B1 | 8/2002 | Wang et al. | |
| 6,437,599 B1 | 8/2002 | Groen | |
| 6,448,223 B1 | 9/2002 | Thilenius | |
| 6,504,397 B1 | 1/2003 | Hart et al. | |
| 6,664,814 B1 | 12/2003 | Evans et al. | |
| 6,665,347 B2 | 12/2003 | van Bavel et al. | |
| 6,919,742 B1 | 7/2005 | McGlinchey | |
| 6,940,302 B1 | 9/2005 | Shumarayev et al. | |
| 7,145,359 B2 | 12/2006 | Hein et al. | |
| 7,317,769 B2 * | 1/2008 | Tonietto et al. ............... 375/340 |
| 7,483,688 B2 | 1/2009 | Huang et al. | |
| 7,492,816 B1 * | 2/2009 | Wong et al. ................... 375/232 |
| 7,643,563 B2 | 1/2010 | Huang et al. | |
| 2003/0128767 A1 * | 7/2003 | Kudoh ........................ 375/257 |
| 2004/0047409 A1 * | 3/2004 | Lee et al. .................... 375/232 |
| 2005/0089126 A1 * | 4/2005 | Zerbe et al. .................. 375/353 |
| 2007/0075776 A1 | 4/2007 | Garlapati et al. | |
| 2007/0182615 A1 | 8/2007 | Aliahmad et al. | |
| 2007/0230513 A1 | 10/2007 | Talbot et al. | |
| 2008/0034378 A1 | 2/2008 | Kumar et al. | |

OTHER PUBLICATIONS

Emitter Coupled Logic, Wikipedia, downloaded Mar. 21, 2007 from URL: http://en.wikipedia.org/wiki/ Emitter_Coupled_Logic, 3 pages.
Heydari, Payam, "Design Issues in Low-Voltage High-Speed Current-Mode Logic Buffers," ACM Great Lakes Symposium on VLSI 2003, Apr. 28-29, 2003, 6 pages.
Notice of Allowance mailed Jun. 16, 2010 in U.S. Appl. No. 11/756,678, 6 pages.
Non-Final Office Action mailed Feb. 18, 2010 in U.S. Appl. No. 11/756,678, 8 pages.

* cited by examiner

*Primary Examiner* — Khanh C Tran
(74) *Attorney, Agent, or Firm* — Zagorin O'Brien Graham LLP

(57) ABSTRACT

An in-band configuration technique configures a data communications link for high-speed data communications between at least a first and second integrated circuit using in-band communications between the first and second integrated circuits. The technique configures at least one equalizer of the data communications link with predetermined equalizer settings selected from a plurality of predetermined equalizer settings based on a selected rate of data communications for the link.

23 Claims, 7 Drawing Sheets

IN-BAND METHOD TO CONFIGURE EQUALIZATION LEVELS

CROSS-REFERENCE TO RELATED APPLICATION(S)

This application claims benefit under 35 U.S.C. §119 of provisional application No. 60/786,546, filed Mar. 28, 2006, entitled "Method and Apparatus for Link Operations," naming Gerry R. Talbot, Paul Miranda, Mark D. Hummel, William A. Hughes, and Larry D. Hewitt as inventors, which application is incorporated by reference herein.

BACKGROUND

1. Field of the Invention

This application is related to integrated circuits and more particularly to data communications links between integrated circuits.

2. Description of the Related Art

Performance characteristics (e.g., bit-error rate) of a communications link between two integrated circuits may be dependent upon configuring at least one element of the communications link to be consistent with the rate of data communications. However, components of a communications link may support different data rates and the rate of data communications between components may be chosen by the system during an initialization routine. Accordingly, techniques for configuring elements of the communications link based on a selected rate of data communications are desired.

SUMMARY

An in-band configuration technique configures a data communications link for high-speed data communications between at least a first and second integrated circuit using in-band communications between the first and second integrated circuits. The technique configures at least one equalizer of the data communications link with predetermined equalizer settings selected from a plurality of predetermined equalizer settings based on a selected rate of data communications for the link. In at least one embodiment of the invention, a method for performing in-band configuration of equalization levels associated with a communications link includes configuring a transmit clock signal to have a first frequency based, at least in part, on supported clock frequencies of a first integrated circuit and at least a second integrated circuit. The transmitter circuit is on the first integrated circuit and coupled to at least one communications path. The supported clock frequencies are determined based, at least in part, on communications at a second frequency over the at least one communications path between the first and second integrated circuits. The method includes configuring at least one equalizer with one or more predetermined settings corresponding to the first frequency. The method includes communicating data between the first and second integrated circuits using the at least one equalizer and the at least one communications path. The data communication is at a rate based, at least in part, on the first frequency.

In at least one embodiment of the invention, an apparatus includes a first integrated circuit having at least one equalizer. The first integrated circuit is configured to receive at a first data rate, over at least one communications path, frequency capability information associated with a second integrated circuit. The first integrated circuit is operable to configure based, at least in part, on the frequency capability information of the second integrated circuit, a transmit frequency and the equalizer with one or more predetermined settings. The at least one communications path is an in-band communications path between the first and second integrated circuits.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
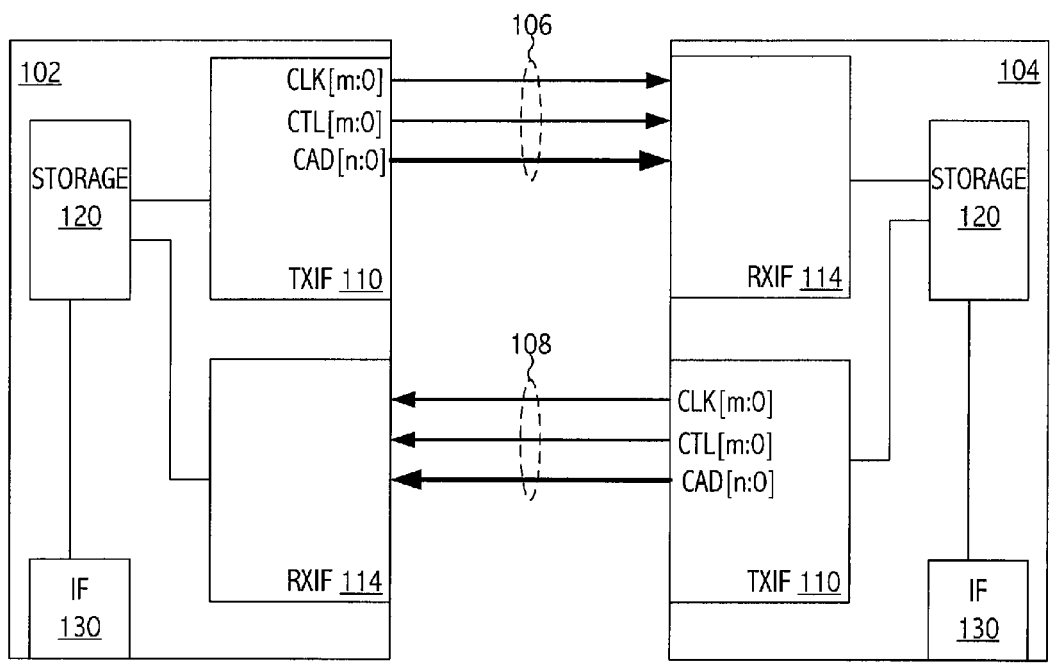
FIG. 1 illustrates a block diagram of two integrated circuit devices coupled by a communications link.

Referring to FIG. 1, integrated circuit 102 communicates with integrated circuit 104 by an exemplary communications link including transmit interfaces 110, receive interfaces 114, and communications paths 106 and 108, which include respective, individual communications paths for clock signals (e.g., CLK[m:0]), control signals (e.g., CTL[m:0]), and data signals (e.g., n-bits of commands, addresses, or data, i.e., CAD[n:0]). Those individual communications paths may be single-ended or differential communications paths. As referred to herein, a full link is formed by bidirectional communications between two integrated circuits, e.g., integrated circuit 102 transmits data that is received by integrated circuit 104 over communications paths 106 and integrated circuit 104 transmits data that is received by integrated circuit 102 over communications paths 108, i.e., integrated circuit 102 is "linked" to integrated circuit 104.

In at least one embodiment of the invention, two data bits (e.g., two CAD[n:0] bits or two CTL[m:0] bits) are transmitted on a corresponding communications path per clock cycle (e.g., a period of a respective one of CLK[m:0]), i.e., a bit-time is half a clock period in duration. However, the teachings herein may be adapted for bit-times having one clock period in duration (i.e., one data bit is transmitted on a corresponding communications path per clock cycle) or for other suitable bit-time durations. Communications paths 106 and 108 are unidirectional, i.e., communications paths 106 provides paths from integrated circuit 102 to integrated circuit 104 and communications paths 108 provides paths to integrated circuit 102 from integrated circuit 104. Integrated circuit 102 includes a sideband control mechanism (e.g., interface 130) that provides access to control and/or status registers internal to integrated circuit 102 (e.g., locations in storage circuit 120). Interface 130 may be a Joint Test Action Group (i.e., JTAG) interface, System Management Bus (i.e., SMBus) interface, or other suitable interface. Interface 130 may be used to communicate test, characterization, and/or diagnostic information between the corresponding integrated circuit and an external processing device (not shown).

A sideband channel (e.g., interface 130) may be used to communicate to a corresponding integrated circuit supported data rate information for all integrated circuits coupled to the communications link and to configure elements of the link for operation at a selected data rate. Integrated circuits 102 and 104 may be configured for data communications operations based thereon. However, interface 130 may be substantially slower than interfaces 110 and 114. In addition, using interface 120 for configuration techniques may introduce on-chip synchronization issues and may substantially complicate system design since integrated circuits 102 and 104 would need to be able to communicate with each other via the sideband channel.

Figure 2A:
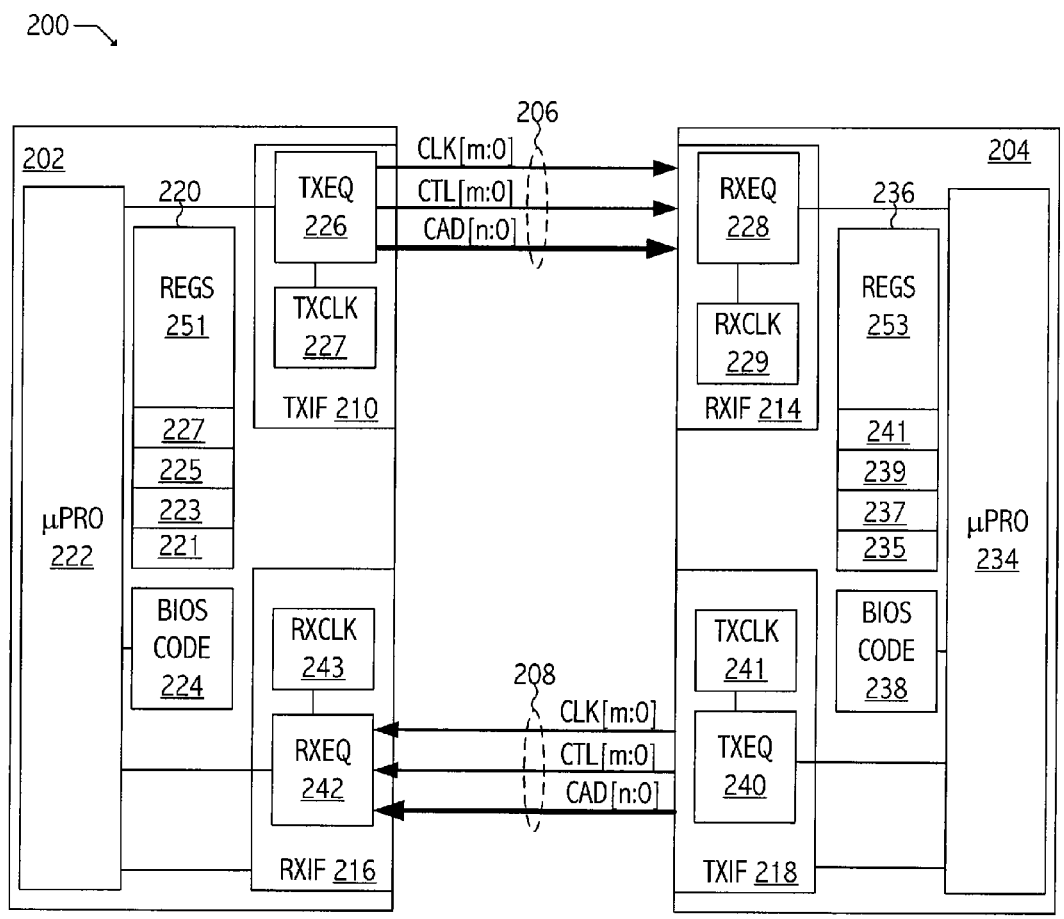
FIGS. 2A and 2B illustrate block diagrams of two integrated circuit devices coupled by a communications link consistent with one or more embodiments of the present invention.

Referring to FIG. 2A, in at least one embodiment of the invention, in-band communications are used by integrated circuits 202 and 204 to configure at least transmit equalizer 226. As referred to herein, "in-band" communications includes sending and receiving of control information on the same communications path(s) as used for data communications. For example, rather than using a sideband channel (e.g., interface 130 of FIG. 1), configuration of transmit equalizer 226 is based on communications between integrated circuits 202 and 204 over communications paths 206 and/or 208. Similarly, transmit equalizer 240, receive equalizer 228, and receive equalizer 242 may be configured by in-band communications between integrated circuit 202 and 204.

In at least one embodiment of system 200, integrated circuits 202 and 204 are each configured to generate a transmit clock signal (e.g., transmit clock signal 227 and transmit clock signal 241, respectively), which are used to generate corresponding CLK[m:0] outputs. The transmit clock signals from each side of the link are configured to have frequencies according to respective link frequency registers 221 and 235. The transmitter and receiver of a particular side of a link (e.g., transmit interface 210 and receive interface 216) operate at substantially the same frequency. The transmit clock on one side of the link (e.g., transmit clock signal 227) has substantially the same frequency as the receive clock in the device to which it is connected (e.g., receive clock signal 229). Note that although only one link is illustrated between integrated circuit 202 and integrated circuit 204, multiple links may couple individual ones of integrated circuit 202 to other devices.

Figure 2B:
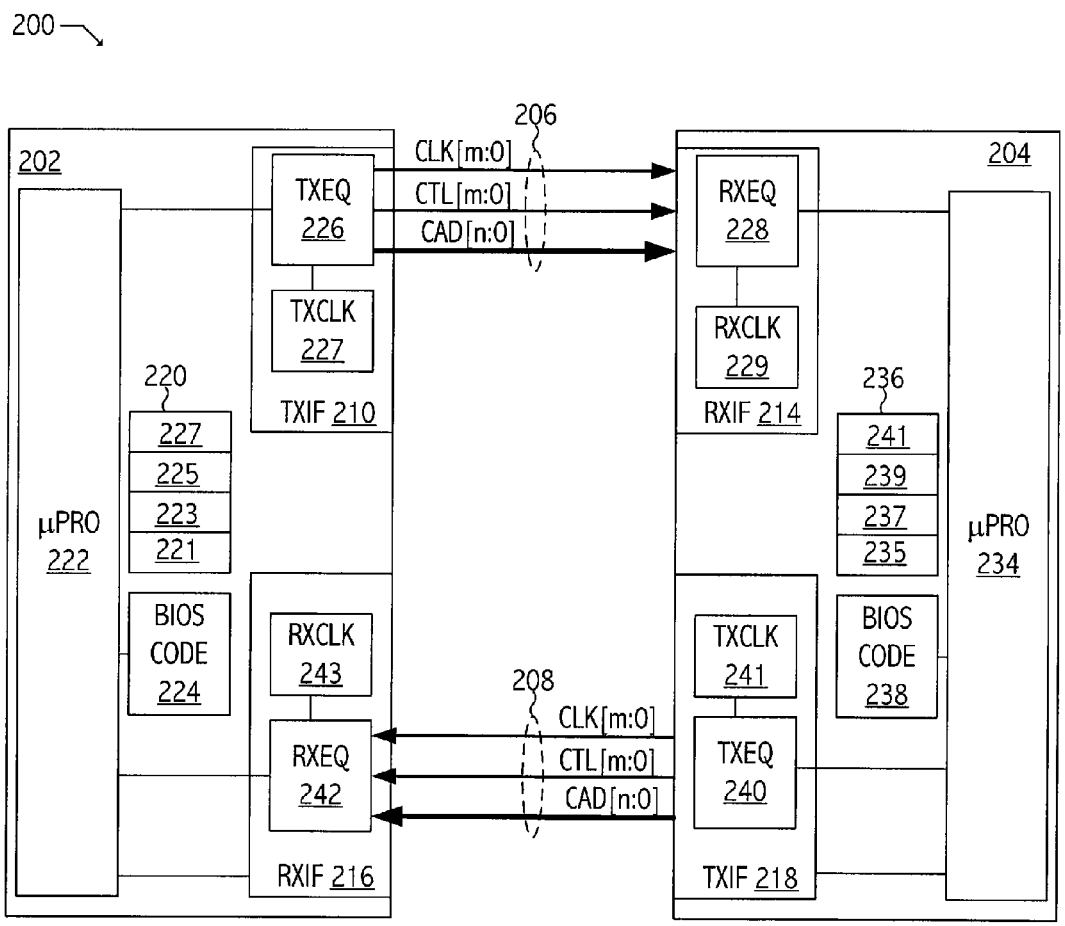
Figure 3A:
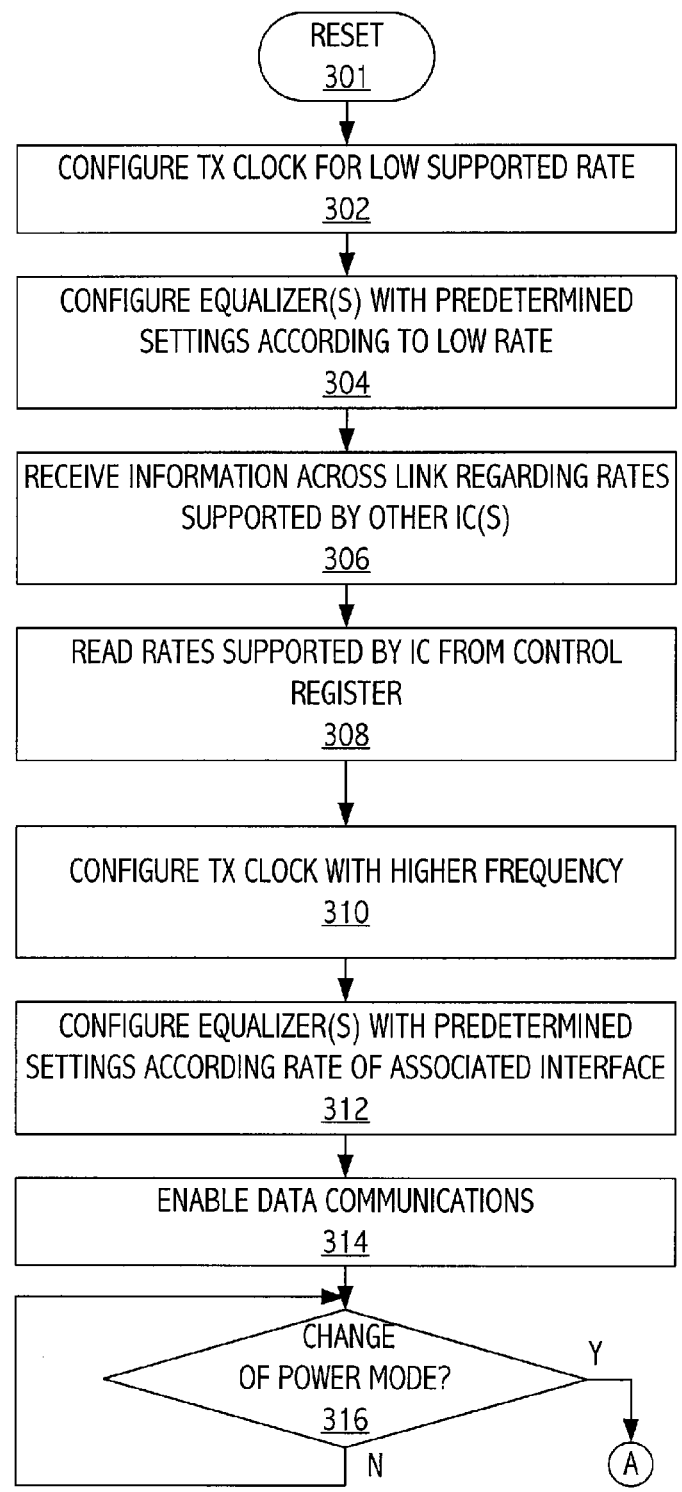
FIGS. 3A and 3B illustrate exemplary information and control flows for an in-band configuration technique consistent with one or more embodiments of the present invention.
Figure 3B:
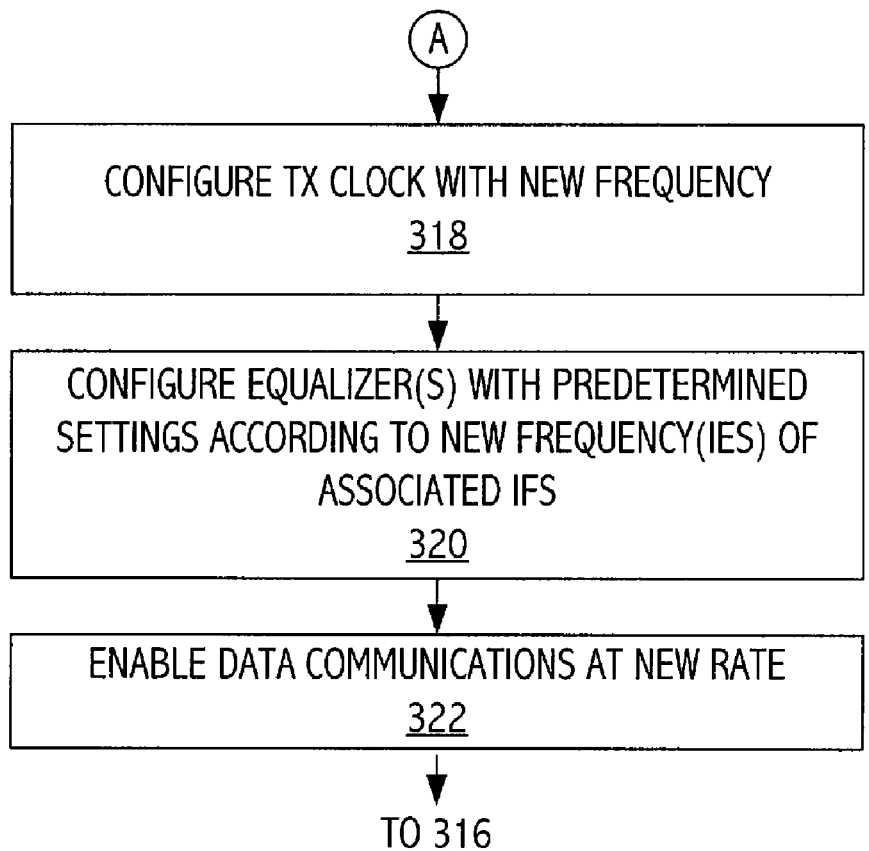

Referring to FIGS. 2A, 2B, 3A, and 3B, in response to detecting a reset (301), integrated circuit 202 configures a transmit clock signal (e.g., transmit clock signal 227) to transition with a low-frequency (e.g., 200 MHz for a DC coupled path or 1.2 GHz for an AC coupled path) (302). The low frequency may be the lowest frequency supported by the data communications interface, or other suitable frequency. Although for simplicity, FIGS. 3A and 3B are discussed with reference to transmit interface 210 of integrated circuit 202 and receive interface 214 of integrated circuit 204, the discussion is applicable to the other path in the link, i.e., the path including transmit interface 218 of integrated circuit 204 and receive interface 216 of integrated circuit 202. Transmit clock signal 227 may be configured by setting appropriate bits in a link frequency register (e.g., link frequency register 221). The transmit equalizer (e.g., transmit equalizer 226) is configured for a rate of data communications consistent with the frequency of the transmit clock signal (e.g., 400 million transfers/s (i.e., MT/s)) (304).

Integrated circuit 202 receives information from integrated circuit 204 over one or more of communications paths 208, or by other suitable techniques, regarding the frequencies supported by the interfaces of integrated circuit 204 (306). Frequency capability information for each link may be stored in a frequency capability register in a control and status register in data storage of the integrated circuit (e.g., frequency capability register 223 of data storage 220 on integrated circuit 202). Frequency capability information may be sent to integrated circuit 202 from integrated circuit 204 over one or more of communications paths 208. Integrated circuit 202 receives this information and accesses data storage 220 for information regarding the frequencies supported by interfaces of integrated circuit 202 (308).

Some or all of the functions of integrated circuit 202 described herein may be performed by instructions executed on microprocessor 222, or by other suitable technique. For example, firmware (e.g., basic input/output system (BIOS) of BIOS code memory 224) running on integrated circuit 202 may read link frequency capability register 223 and receive contents of link frequency capability register 237. In general, the BIOS performs various functions, including inventorying, testing, and initializing system components. The BIOS facilitates programmer and user interaction with the system hardware. The operating system and application programs of a computer system can access the BIOS rather than directly manipulating I/O ports, registers and control words of the specific system hardware. The BIOS can be accessed through an interface of software interrupts and contains a plurality of entry points respectively corresponding to the different interrupts.

Integrated circuit 202 uses the reported frequency capability information for both integrated circuit 202 and integrated circuit 204 to determine a frequency to be used for the link. In at least one embodiment of system 200, integrated circuit 202 chooses as the transmit clock frequency, the highest frequency supported by the link (i.e., the highest frequency supported by both integrated circuit 202 and integrated circuit 204) (310). Integrated circuit 202 may also base the link frequency determination on other suitable information, e.g., information regarding the layout of a printed circuit board including integrated circuit 202 and/or integrated circuit 204 and power requirements. Once integrated circuit 202 determines the link frequency, integrated circuit 202 writes the link frequency to link frequency register 221. Integrated circuit 202 may communicate the link frequency to integrated circuit 204 or integrated circuit 204 may independently determine the link frequency, in a manner consistent with the determination of integrated circuit 202. Once the link frequency is known by integrated circuit 204, integrated circuit 202 writes the value to link frequency register 235.

Figure 4:
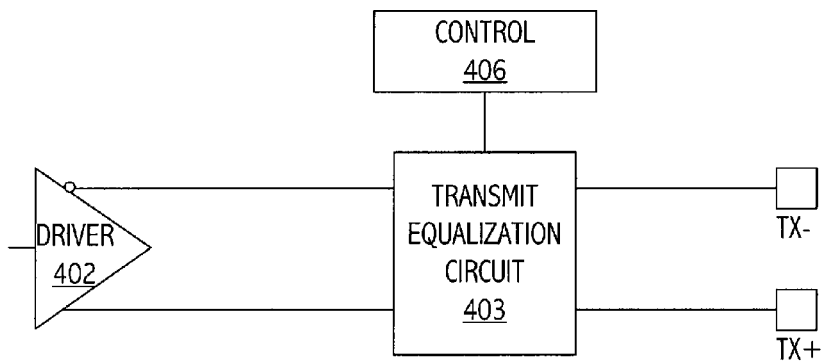
FIG. 4 illustrates a block diagram of a portion of a communications link transmit path on an integrated circuit device consistent with one or more embodiments of the present invention.

In at least one embodiment of system 200, transmit equalizer 226 includes an equalizer circuit that is configurable according to the frequency of a corresponding transmit clock signal (e.g., transmit clock signal 227). Once the transmit clock frequency is determined, integrated circuit 202 configures transmit equalizer 226 accordingly (312). Referring to FIG. 4, an exemplary transmit interface includes a driver 402, and a transmit equalization circuit 404. Note that the transmit interface may include termination circuitry, electrostatic discharge protection circuitry, or other circuitry (not shown). Transmit equalization circuit 404 includes circuitry controllable by control circuit 406 to scale, by a programmable amount, the voltage swing of a signal generated by transmit interface 210 of FIG. 2. In at least one embodiment of system 200, transmitter equalizers 226 and 240 implement de-emphasis equalization, although techniques described herein are applicable to other suitable equalization techniques.

In at least one embodiment of system 200, transmitter equalizers 226 and 240 each include a pre-cursor de-emphasis equalizer (i.e., the amplitude changes in the bit-time before transition of the signal to a new logic value) and a post-cursor de-emphasis equalizer (i.e., the amplitude changes after transition of the signal to a new logic value). Control bits in a transmitter configuration register of data storage 220 enable respective ones of the pre-cursor and post-cursor de-emphasis equalizers and determine the number of steps of de-emphasis equalization for each of the equalizers. For example, five control bits in transmit configuration register 225 of data storage 220 correspond to 32 steps of post-cursor de-emphasis, which range from no de-emphasis to 50% scaling of the output voltage swing. Similarly, another five control bits in transmit configuration register 225 correspond to 32 steps of pre-cursor de-emphasis. Integrated circuit 202 may write transmit configuration register 225 with settings for the pre-cursor and post-cursor de-emphasis equalizers corresponding to a selected rate of data communications for the interface. In at least one embodiment of system 200 (e.g., system 200 of FIG. 2A), those settings are retrieved from data storage 220 (e.g., one or more of registers 251) based on the contents of link frequency register 221 (e.g., a 4-bit link frequency encoding field). In another embodiment of system 200 (e.g., system 200 of FIG. 2B), the BIOS configures the equalization settings using appropriate firmware techniques. Accordingly, data storage 220 and 236 of system 200 may not include registers 251 and 253, respectively, which are used for storage of those settings in each device of FIG. 2A, thus allowing for a reduction in size of data storage 220 and 236, as illustrated in FIG. 2B.

An exemplary post-cursor transmit de-emphasis equalizer compensates for high-frequency loss characteristics of the channel by using a programmable amount of post-cursor de-emphasis. The differential output level that is transmitted after remaining at the same logic level for more than one bit-time is programmable. For example, an exemplary transmit post-cursor equalization filter may have the following transfer function:

$$H(z)=1+b1 \times z^{-1}+b2 \times z^{-2}+b3 \times z^{-3}.$$

The exemplary de-emphasis level for transmit post-cursor de-emphasis equalization may be calculated in dB:

$$DE = 20 \times \log_{10}\left(\frac{V_{TX-DIFF-DE}}{V_{TX-DIFF}}\right).$$

Figure 5:
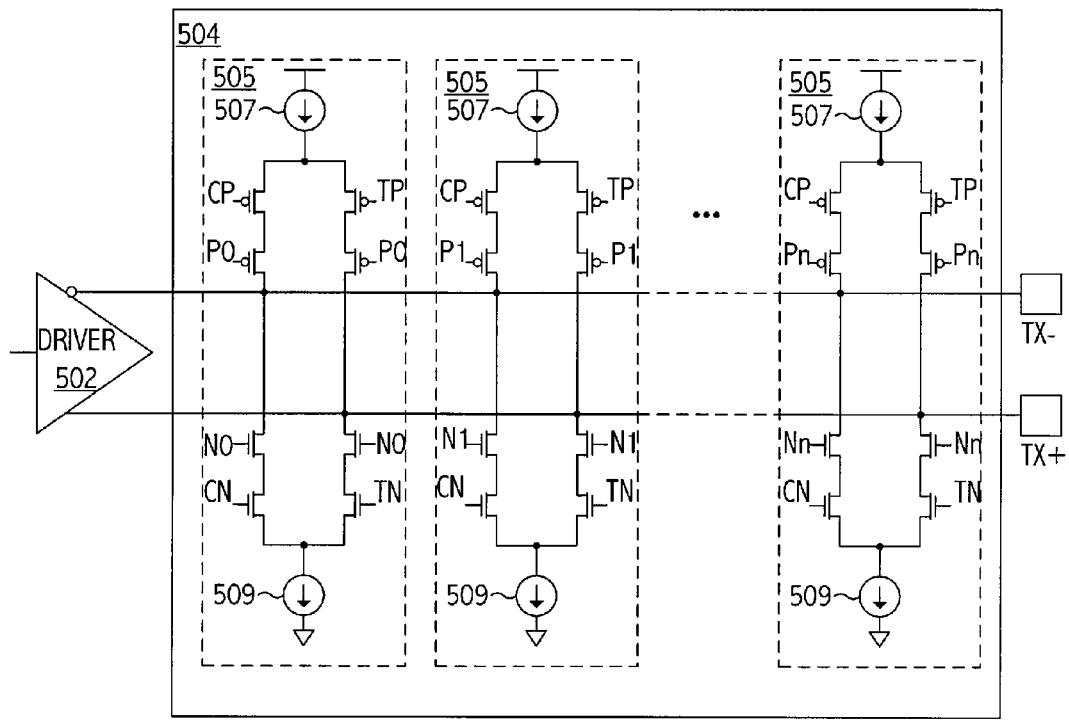
FIG. 5 illustrates a block diagram of an exemplary portion of the transmit path of FIG. 4 consistent with one or more embodiments of the present invention.

Referring to FIG. 5, in at least one embodiment of transmit interface 210, an exemplary transmit equalization circuit 504 may be configured to perform transmit post-cursor de-emphasis equalization. Transmit equalization circuit 604 includes $2^n-1$ (e.g., 31) instantiations of circuit 505, providing n (e.g., five) bits of programmability to transmit de-emphasis equalization. Although circuits 505 are illustrated as having identical transistor sizes, other embodiments of transmit equalization circuit 504 may binary weight transistor sizes to provide other voltage margining and/or equalization functions. Current sources 507 and current sinks 509 may be generated by precision digital to analog converters. When all current sources/sinks are effectively enabled (i.e., providing full output voltage swing), a total current of approximately 6 mA flows from TX+ through a load (not shown) and back into TX−. Control signal pairs TN and CP and TP and CN are true-complement pairs of signals generated by control circuit 606 to implement the transmit de-emphasis function. Strength control signals P0, P1, . . . , Pn, being '0' and, N0, N1, . . . , Nn are controlled based on a number of de-emphasis steps being used at a particular data communications rate. A full-swing output signal corresponds to the strength control signals P0, P1, . . . , Pn, being '0' and, N0, N1, . . . , Nn, being '1'. However, other combinations of these control signals may provide the same functionality. Note that other suitable equalization techniques and corresponding equalizer parameters may be configured with predetermined settings stored in a corresponding one of data storage 236 and 220, based on the transmit clock signal frequency.

Referring back to FIG. 2, in at least one embodiment of system 200, receive interfaces 216 and 214 include respective receive equalizers (e.g., receive equalizer 242 and receive equalizer 228, respectively). In at least one embodiment of system 200 (e.g., system 200 of FIG. 2A), data storage 236 includes predetermined parameters corresponding to particular rates of a transmit clock signal associated with a respective receive equalizer. In another embodiment of system 200 (e.g., system 200 of FIG. 2B), the BIOS code includes routines for configuring the equalization settings using appropriate firmware techniques. Accordingly, data storage 220 and 236 of system 200 may not include registers 251 and 253, respectively, which are used for storage of those settings in each device of FIG. 2A, thus allowing for a reduction in size of data storage 220 and 236, as illustrated in FIG. 2B. Using firmware techniques, hardware techniques or a combination thereof, integrated circuit 204 configures receive equalizer 228 with predetermined parameters corresponding to a frequency of the receive clock signal 229 (which is substantially the same as the frequency of transmit clock signals 227 and 241). For example, integrated circuit 204 configures receive equalizer 228 based on the frequency of the receive clock signal 229 (312).

In at least one embodiment of system 200, receiver interface 214 and/or receiver interface 216 include an equalizer circuit, e.g., a decision feedback equalizer circuit or other suitable equalizer circuit. Exemplary decision feedback techniques are described in U.S. patent application Ser. No. 11/469,937, filed Sep. 5, 2006, entitled "Decision Feedback Restore," naming Emerson S. Fang et al. as inventors, which is incorporated herein by reference.

A receiver configuration register 239 of data storage 236 includes receive equalization fields that enable a receiver equalizer circuit and determine the amount of receiver equalization used. Integrated circuit 204 writes receiver configuration register 229 with settings for the equalizer corresponding to the particular selected rate of data communications over the link. Those settings are selected from a plurality of predetermined equalizer settings and retrieved from data storage 236 based on the contents of link frequency register 235 (e.g., a 4-bit link frequency encoding field).

Figure 6:
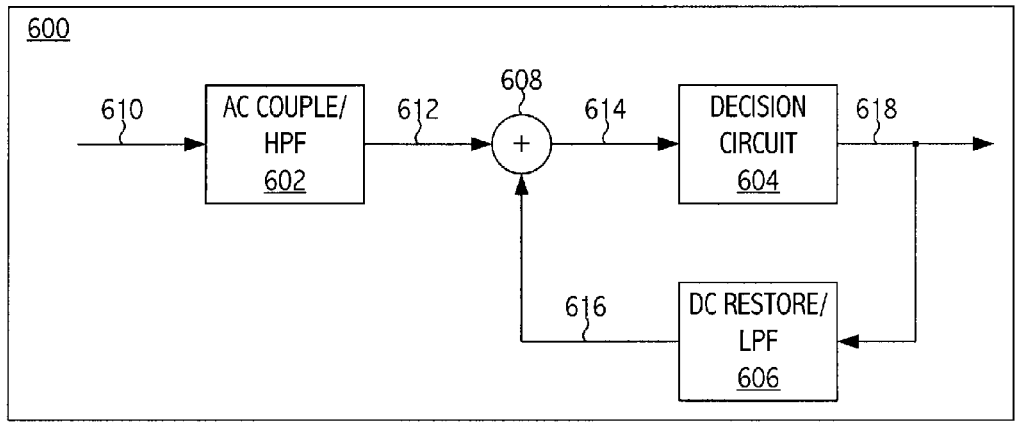
FIG. 6 illustrates a block diagram of an exemplary portion of a receive path of an integrated circuit device consistent with one or more embodiments of the present invention.

Referring to FIG. 6, an exemplary receive equalizer implements a decision feedback restore technique that substantially reduces or eliminates effects of DC or baseline wander in an AC coupled receive interface. A low-frequency signal (e.g., low-frequency signal 616) corresponding to the received signal is reconstructed by low-pass filtering an output (e.g., signal 618) of a decision circuit (e.g., decision circuit 604, which may be a slice circuit or other suitable decision circuit). Low-frequency signal 616 is combined with AC signal 612 to generate a restored version of the received signal, e.g., restored signal 614, which is then processed by the receive circuitry. In at least one embodiment, the decision feedback restore technique is a digital algorithm that is readily implemented in a CMOS manufacturing process, or other suitable process. In addition, the decision feedback restore technique can be implemented with a fast response time and without a high-speed, precision DAC circuit.

Figure 7:
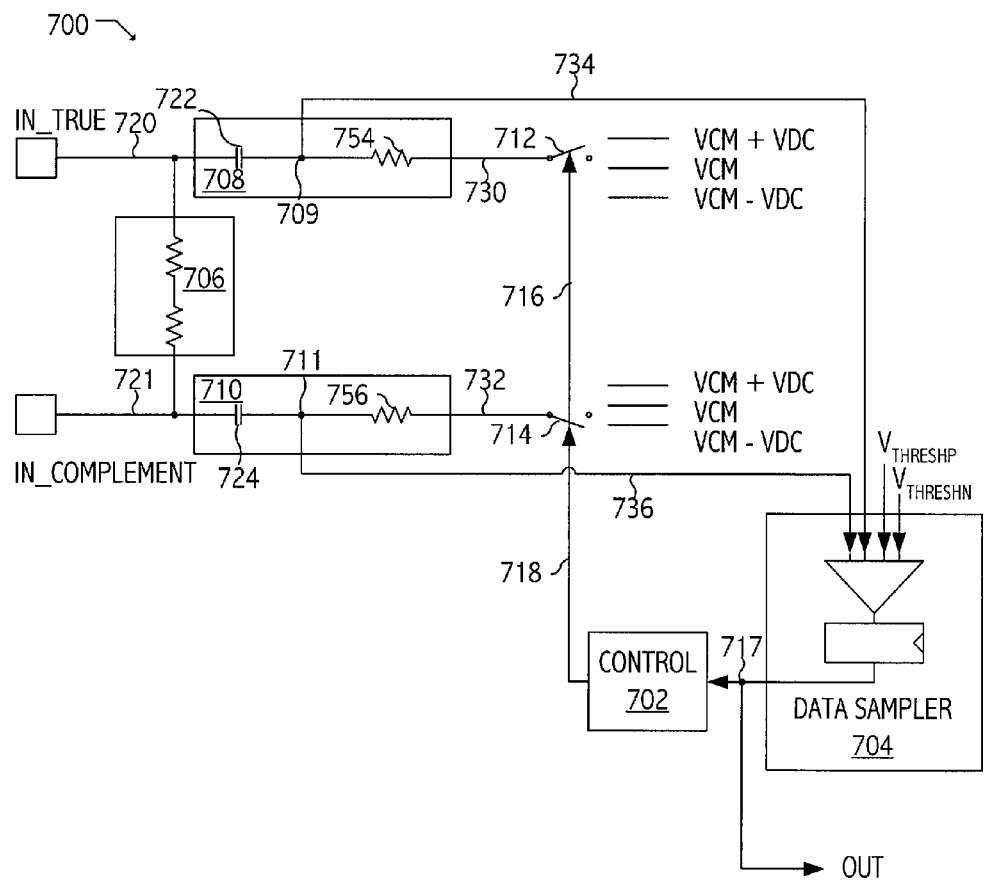
FIG. 7 illustrates exemplary portions of a decision feedback restore circuit of a receiver interface consistent with at least one embodiment of the invention.

Referring to FIG. 7, an exemplary decision feedback restore circuit (e.g., decision feedback restore circuit 700), receives a signal (e.g., the received signal on the differential node formed by nodes 720 and 721). In addition to termination circuit 706, decision feedback restore circuit 700 may include pads, electrostatic discharge (i.e., ESD) protection circuitry, or other circuitry coupled to nodes 720 and 721. Decision feedback restore circuit 700 high-pass filters the received signal using filter 708 and filter 710. The resulting high-frequency signal is received by nodes 709 and 711. As referred to herein, a high-frequency signal is a signal having a frequency response consistent with an output signal received from a high-pass filter having a time constant $\tau_H$. A restore signal is generated by low-pass filtering a reference signal supplied to differential node 730 and 732, and the resulting low-frequency signal is received by differential node 709 and 711. As referred to herein, a low-frequency signal is a signal having a frequency response consistent with an output signal received from a low-pass filter having a time constant $\tau_L$.

In at least one embodiment of decision feedback restore circuit 700, $\tau_H$ associated with the high-pass filter (i.e., AC coupling filter) that generates the high-frequency signal is substantially equal to $\tau_L$ associated with the low-pass filter (i.e., restore filter) that generates the low-frequency signal (i.e., the filtered version of the reference signal). Note that although separate filter circuits may be used to implement the AC coupling filter and the restore filter functions, in at least one embodiment of decision feedback restore circuit 700, the AC coupling filter and the restore filter functions are implemented using the same passive devices (e.g., resistor 754 and capacitor 722 of filter 708 and resistor 724 and capacitor 756 of filter 710). The time constant of the AC coupling filter equals the time constant of the restore filter (i.e., $\tau_H = \tau_L = RC$), which substantially reduces or eliminates issues related to matching low-pass filter characteristics to high-pass filter characteristics and which increases the insensitivity to process variations of decision feedback restore circuit 700. In at least one embodiment of decision feedback restore circuit 700, the RC time constant of filter 708 and filter 710 is substantially greater than a unit interval (e.g., RC time constant is approximately 100 ns or greater and a unit interval is approximately 200 ps-400 ps).

Nodes 709 and 711 sum the high-frequency signal generated by filters 708 and 710, respectively, and the low-frequency signal generated by filters 708 and 710, respectively, to generate the restored signal on differential node 734 and 736. Data sampler 704 compares the restored signal on differential node 734 and 736 to a threshold value (e.g., differential threshold value $V_{THRESHP}$ and $V_{THRESHN}$) to output a decision value, i.e., an indicator of whether the data is a '1' or a '0.' One or more state elements may store the decision value or a plurality of sequential decision values, and provide the stored decision value or values (e.g., decision value 717) to control circuit 702.

Referring back to FIGS. 2, 3A, and 3B, in at least one embodiment of system 200, at least one of receive equalizers 228 and 242 includes a decision feedback restore circuit 700 that is configurable according to the frequency of a corresponding transmit clock signal. For example, parameters that may be configured based on a corresponding transmit clock signal frequency include the offset level (e.g., VDC) used to determine the level above the VCM and below VCM, which is based on the transmit DC signal swing (e.g., approximately 300 mV, with no transmit de-emphasis, to approximately 150 mV or less, with 6 dB of transmit de-emphasis). However, other suitable parameters of decision feedback restore circuit 700 may be configured using hardware techniques (e.g., predetermined settings stored in registers 251 and 253 of data storage 220 and 236, respectively), firmware techniques (e.g., using the BIOS), or a combination thereof, based on the receive clock signal frequency.

After configuring the transmit clock signal, equalizer circuit(s), and other relevant circuitry for high-frequency data communications, integrated circuits 202 and 204 may initiate data communications (314) over communications paths 206 and 208. For example, in at least one embodiment of system 200, firmware executing on microprocessor 222 and firmware executing on microprocessor 234 each initiate a reset disabling, enabling, and/or resetting of affected buses to cause the new frequency to take effect.

In at least one embodiment of system 200, configuration of the transmit clock signal and one or more associated equalizer circuits may be reconfigured based on system 200 detecting a change in power mode (316), e.g., entering a power savings mode. Integrated circuit 202 determines a new frequency of the transmit clock (e.g., the same frequency or another frequency) and configures the transmit clock signal and transmit equalizer accordingly (318, 320). For example, integrated circuit 202 may conserve power by choosing as the transmit clock frequency, the lowest frequency supported by both integrated circuit 202 and integrated circuit 204 (318). This determination may be performed by firmware executing on microprocessor 222, or by other suitable technique. Once the transmit clock frequency is determined, integrated circuit 202 configures transmit equalizer 226 accordingly (320). After configuring the transmit clock signal, the transmit equalizer, and other relevant circuitry for lower-frequency communications, integrated circuits 202 and 204 may begin data communications at the new rate (322). Similarly, system 200 may transition from a low-power mode to a higher power mode based on detecting a change in the power mode, e.g., a portable device transitions to a higher power mode when switching from receiving power from an energy storage device to receiving power from a wall outlet.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM), or electronic medium.

The description of the invention set forth herein is illustrative, and is not intended to limit the scope of the invention as set forth in the following claims. For example, while the invention has been described in an embodiment in which integrated circuit 202 and integrated circuit 204 form a single-link topology, one of skill in the art will appreciate that the teachings herein can be utilized to form a daisy chain topology, a tree topology, or other system topologies. In addition, integrated circuit 202 or integrated circuit 204 may be a host device, bridge device, or tunnel device and integrated circuit 202 and integrated circuit 204 may include one or two links. Variations and modifications of the embodiments disclosed herein, may be made based on the description set forth herein, without departing from the scope and spirit of the invention as set forth in the following claims.

What is claimed is:

1. A method for performing in-band configuration of equalization levels associated with a communications link comprising:
    configuring a transmit clock signal of a transmitter circuit on a first integrated circuit and coupled to at least one communications path to have a first frequency based, at least in part, on supported clock frequencies of the first integrated circuit and at least a second integrated circuit, the supported clock frequencies being determined based, at least in part, on communications at a second frequency over the at least one communications path between the first and second integrated circuits;
    configuring at least one equalizer with one or more predetermined settings corresponding to the first frequency; and
    communicating data between the first and second integrated circuits using the at least one equalizer and the at least one communications path, the data communication being at a rate based, at least in part, on the first frequency.

2. The method, as recited in claim 1, wherein the data communication includes a plurality of packet sequences originating at one of the first and second integrated circuits and terminating at the other of the first and second integrated circuits.

3. The method, as recited in claim 1, further comprising:
    configuring the transmit clock signal to have a frequency based, at least in part, on the second frequency; and
    configuring the at least one equalizer with one or more predetermined settings corresponding to the second frequency,
    wherein the second frequency is substantially less than the first frequency and determination of the supported clock frequencies occurs while the at least one equalizer is configured with one or more predetermined settings corresponding to the second frequency.

4. The method, as recited in claim 1, wherein the equalizer is configured by a basic input/output system (BIOS) associated with an individual one of the first and second integrated circuits including the equalizer.

5. The method, as recited in claim 1, wherein the determining supported clock frequencies comprises:
    reading respective individual frequency capability registers corresponding to the first and second integrated circuits.

6. The method, as recited in claim 1, wherein the first frequency is based, at least in part, on information related to a layout of a printed circuit board attached to at least one of the first and second integrated circuits.

7. The method, as recited in claim 1, wherein the configuring the at least one equalizer comprises:
    selecting the one or more predetermined settings corresponding to the first frequency from a plurality of predetermined settings for the equalizer.

8. The method, as recited in claim 1, wherein the at least one equalizer includes a transmitter equalizer and a receiver equalizer.

9. The method, as recited in claim 1, wherein the transmit clock and a data signal are communicated between the first and second integrated circuits on separate ones of the at least one communications path.

10. The method, as recited in claim 1, further comprising:
    configuring the transmit clock signal to have a third frequency based, at least in part, on the supported clock frequencies and a power savings mode indicator;
    configuring the at least one equalizer to have settings corresponding to the third frequency; and
    communicating data between the first and second integrated circuits using the at least one equalizer and the at least one communications path, the data communication being at a rate based, at least in part, on the third frequency.

11. The method, as recited in claim 1, wherein the at least one communications path is at least one of a bus coupling the first and second integrated circuits within an embedded application, a bus on a printed circuit board coupling the first and second integrated circuits on a single printed circuit board, and a bus coupling the first and second integrated circuits on separate printed circuit boards.

12. An apparatus comprising:
    means for configuring a transmit clock signal of a transmitter circuit and at least one equalizer on a first integrated circuit and coupled to at least one communications path to have a first frequency based on supported clock frequencies of the first integrated circuit and at least a second integrated circuit, the supported clock frequencies being determined based on communications at a second frequency over the at least one communications path between the first and second integrated circuits, the at least one equalizer being configured with one or more predetermined settings corresponding to the first frequency; and
    means for communicating data between the first and second integrated circuits using the at least one equalizer and the at least one communications path, the data communication being at a rate based, at least in part, on the first frequency.

13. An apparatus comprising:
    a first integrated circuit comprising:
        a transmitter circuit; and
        at least one equalizer circuit;
    wherein the first integrated circuit is operative to configure a transmit clock signal of the transmitter circuit coupled to at least one communications path to have a first frequency based on supported clock frequencies of the first integrated circuit and at least a second integrated circuit,
    wherein the first integrated circuit is further operative to determine the supported clock frequencies based on communications at a second frequency over the at least one communications path between the first and second integrated circuits,
    wherein the first integrated circuit is further operative to configure the at least one equalizer circuit with one or more predetermined settings corresponding to the first frequency, and
    wherein the first integrated circuit is further operative to communicate data with the second integrated circuit using the at least one equalizer and the at least one communications path, the data being communicated at a rate based on the first frequency.

14. The apparatus, as recited in claim 13, wherein the at least one equalizer circuit includes a transmitter equalizer and a receiver equalizer.

15. The apparatus, as recited in claim 13, wherein the first integrated circuit further comprises a basic input/output system (BIOS) configured to provide the one or more predetermined setting settings to the equalizer circuit.

16. The apparatus, as recited in claim 13, wherein the first integrated circuit comprises at least one storage element configured to store a frequency capability of the first integrated circuit.

17. The apparatus, as recited in claim 13, further comprising:
the at least one communications path;
the second integrated circuit coupled to the at least one communications path, the second integrated circuit comprising at least one storage element configured to store a frequency capability of the second integrated circuit.

18. The apparatus, as recited in claim 13, further comprising:
the at least one communications path;
the second integrated circuit; and
a printed circuit board;
wherein the first integrated circuit and the second integrated circuit are attached to the printed circuit board and coupled to each other by the at least one communications path.

19. The apparatus, as recited in claim 13, further comprising:
the at least one communications path;
an integrated circuit substrate; and
the second integrated circuit,
wherein the first integrated circuit and the second integrated circuit are formed on the integrated circuit substrate and coupled to each other by the at least one communications path.

20. The apparatus, as recited in claim 13, wherein the first integrated circuit is configured to communicate a plurality of packet sequences to the second integrated circuit over the at least one communications path.

21. The apparatus, as recited in claim 13, wherein the second frequency is substantially less than the first frequency and determination of the supported clock frequencies occurs while the at least one equalizer is configured with one or more predetermined settings corresponding to the second frequency.

22. The apparatus, as recited in claim 13, wherein the determining supported clock frequencies comprises:
reading respective individual frequency capability registers corresponding to the first and second integrated circuits.

23. The apparatus, as recited in claim 13, wherein the transmit clock and a data signal are communicated between the first and second integrated circuits on separate ones of the at least one communications path.

* * * * *

UNITED STATES PATENT AND TRADEMARK OFFICE
CERTIFICATE OF CORRECTION

| | | |
|---|---|---|
| PATENT NO. | : 7,986,727 B2 | Page 1 of 1 |
| APPLICATION NO. | : 11/614529 | |
| DATED | : July 26, 2011 | |
| INVENTOR(S) | : Gerald R. Talbot et al. | |

It is certified that error appears in the above-identified patent and that said Letters Patent is hereby corrected as shown below:

In column 11, Claim 15, line 4, please delete "setting".

Signed and Sealed this
Thirtieth Day of August, 2011

David J. Kappos
*Director of the United States Patent and Trademark Office*